United States Patent [19]

Itoh et al.

[11] 4,364,535

[45] Dec. 21, 1982

[54] COUNTERBALANCE MECHANISM FOR LASER KNIFE DEVICE

[75] Inventors: Kiyoshi Itoh, Kamifukuoka; Tetuo Kamoshita, Toda; Teruo Sakai, Warabi; Harumi Kawasaki, Oyaguchi kami, all of Japan

[73] Assignee: Asahi Kogaku Kogyo Kabushiki Kaisha, Tokyo, Japan

[21] Appl. No.: 167,959

[22] Filed: Jul. 14, 1980

[30] Foreign Application Priority Data

Jul. 18, 1979 [JP] Japan ................... 54/91437

[51] Int. Cl.³ .................. F16L 3/00; A47G 29/00
[52] U.S. Cl. .................. 248/123.1; 248/280.1; 350/522; 350/543; 350/567
[58] Field of Search ........... 248/123.1, 280.1, 281.1, 248/648, 325, 297.1; 350/85; 128/303.1

[56] References Cited

U.S. PATENT DOCUMENTS

| | | | |
|---|---|---|---|
| 2,224,901 | 12/1940 | Cunningham | 280/47.11 X |
| 3,762,796 | 10/1973 | Heller | 350/85 |
| 3,891,301 | 6/1975 | Heller | 350/85 |
| 3,913,582 | 10/1975 | Sharon | 128/303.1 |
| 4,241,891 | 12/1980 | Rudolph | 248/123.1 |
| 4,243,025 | 1/1981 | Jones | 248/123.1 X |

Primary Examiner—J. Franklin Foss
Attorney, Agent, or Firm—Sughrue, Mion, Zinn, Macpeak & Seas

[57] ABSTRACT

A counterbalance mechanism for a laser knife device which includes a manipulator in which the overall height of the balance mechanism is quite short and all rotational moments of the manipulator are cancelled for all operative positions thereof. A base support arm is rotatably mounted around a short first hollow arm with a second hollow arm extending through upright portions of the base support arm joined at its two ends through articulations to the upper end of the first hollow arm and a third hollow arm. A parallelogram link mechanism is formed including the upright members of the base support arm, first and second substantially parallel support arms and a third substantially vertical support arm upon which a counterbalance weight is mounted. One end of the first support arm is pivotably mounted between the upright members of the base support arm while the corresponding end of the second support arm is pivotably mounted around the second hollow arm between the upright members.

6 Claims, 4 Drawing Figures

COUNTERBALANCE MECHANISM FOR LASER KNIFE DEVICE

BACKGROUND OF THE INVENTION

The present invention relates to a counterbalance mechanism for a manipulator mechanism used with a laser knife device.

Most of the laser knives which have been developed are $CO_2$ laser knives, that is, they operate with a $CO_2$ light source. These $CO_2$ laser knives are very similar to one another in their mechanical structure irrespective of their specific model or type. In these devices, a laser beam emitted by a $CO_2$ laser source is transmitted through a light conducting mechanism having a flexible arm structure which has totally reflecting mirrors positioned in its articulation joints. The beam is focused to a small spot by a focusing lens provided at the end of the light conducting mechanism.

The construction of the conventional manipulator is generally as follows. The manipulator is provided with a long horizontal arm extending horizontally from a laser source and a long vertical arm extending downwardly from the end of the horizontal arm. At the juncture between the two arms, a flexible articulation such as described above is positioned. The end portion of the vertical arm is constructed of three flexible articulation each coupled to an arm. The last articulation coupled to the last arm in the sequence holds a focusing lens. The last arm corresponds to the handle of a knife and it is, in general, called "a handpiece". The operator holds and manupulates the handpiece to control the laser irradiation position. The long horizontal arm and the long vertical arm of the manipulator are used to move the end of the handpiece as desired there-dimensionally, up and down, right and left, and forward and backward. The three articulations at the end of the vertical arm are used to precisely and accurately control the position and direction of the irradiation point.

Examples of such a conventional manipulator are disclosed in the specifications of U.S. Pat. No. 3,913,582 and of Japanese Laid-Open Patent Application No. 94182/1974. The conventional manipulator has a flexible light conducting path with seven mirrors and eight arms one of which is a quite long horizontal arm. In order to maintain the horizontal arm horizontal, it is absolutely necessary to provide a counterbalance. Such a conventional manipulator will be described in detail below.

A first essential condition required for the manipulation is that its operation be smooth and light so that the operator can operate the handpiece smoothly and easily as if he was using an ordinary surgical knife. Any mechanism which fatigues the operator during a surgical operation which lasts for a long period of time is not acceptable. A second essential condition is that the manipulator be so designed that its arm is sufficently long to cover all the positions needed for different kinds of surgical operations.

An essential condition required for the counterbalance mechanism is that it be simple and have no protruding components. If the counterbalance mechanism does have such a protruding component, the operator or his helper may come into contact with it jarring the knife during an operation or the protruding component may strike an overhead operating lamp.

In order to meet the first condition required for the manipulator, it is necessary that, irrespective of the positions of the manipulator and handpiece, no reaction force due to the variations of their positions be applied to the operator's hand. In other words, it is necessary that, when the operator removes his hand from the manipulator which has been set in a desired position, the position of the manipulator thus set remain unchanged. Hereinafter, this will be referred to as "moment-free operation" when applicable. Especially, the horizontal arm of the manipulator, which moves both vertically and horizontally, needs a counterbalance mechanism which provides for moment-free operation of the manipulator.

In moving the vertical arm forwardly and backwardly, a second counterbalance mechanism is necessary for moment-free operation. However, the provision of the second counterbalance mechanism may be eliminated due to the following reasons. The rigidity of a part of the manipulator extending from the vertical arm may not be higher than that of the horizontal arm although the rigidity of the horizontal arm should of course be high enough to prevent bending of the horizontal arm under its own weight. Therefore, this part of the manipulator may be made light in weight. The stable, neutral position of this part will be in a vertical direction at all times. Accordingly, the reaction force imparted to the operator when the vertical arm is moved forwardly and backwardly is much smaller than that imparted to him when the horizontal arm is moved up and down or right and left. Another reason is that the provision of the counterbalance mechanism makes the manipulator intricate in construction and increases the weight thereof thereby lowering the operability of the manipulator.

In a conventional counterbalance mechanism, the end of the horizontal arm is lifted through a gimbal mechanism by a balance bar. As the fulcrum of the balance bar is above the center of rotation of the horizontal arm, the balance bar can turn while being rotated in a vertical or horizontal direction with respect to the horizontal arm. In addition, the balance bar is provided with a weight on the opposite side of the suspension point with respect to the fulcrum in order to balance the weight of the manipulator.

FIG. 1 shows an example of a conventional counterbalance mechanism. Such a conventional counterbalance mechanism is described in detail in U.S. Pat. No. 3,913,582 issued to the Laser Industry Co. and Japanese Laid-Open Patent Application Ser. No. 94182/1974 and therefore it will be only described briefly here. A shaft 2 is disposed in a sleeve 1 in such a manner as to be movable vertically. A laser rack 3 is secured to the top of the shaft 2, and a $CO_2$ laser source 4 is mounted on the laser rack 3. A laser beam from the laser emitting outlet laser source is directed along the axis of a first arm 61 of a manipulator, that is, in the vertical direction.

The manipulator includes seven articulations 51 through 57 each provided with a reflecting mirror, arms 61 through 67 connecting the articulations, and a handpiece 7. Each of the articulations is designed so that it can turn around the axis of the corresponding arm as indicated by arrows. A focusing lens (not shown) is provided in the handpiece 7 to focus the laser beam at a focal point F. The operation of the manipulator thus constructed is as described above.

The prior art counterbalance mechanism will next be described. A support 6 fixedly secured to the top of the first articulator 51 of the manipulator has a pin 8 which is provided on a horizontal axis 10. A balance bar 12 is coupled through the pin 8 to the support 6 in such a manner that it can turn around the horizontal axis 10. A gimbal mechanism 14 for lifting the third arm 63 is provided at a point 13 on one end of the balance bar 12. The coupling position of the gimbal mechanism 14 is before the rotary cylinder 5 of the articulation 53. A weight 15 is secured to the other end of the balance bar 12. The weight 15 is heavy enough to balance the weight of the manipulator so that normally the third arm 63 is maintained substantially horizontal in a neutral position. The axis of the pin 8, namely the horizontal axis 10, intersects at a right angle with the axis of the first arm 61 which is rotatable around its vertical axis. Therefore the third arm 63 can turn freely around the horizontal axis 10 and around the first arm 61 in both vertical and horizontal directions. The reason why the gimbal mechanism 14 is provided is as follows. The arm 63 has a different rotational center and radius of rotation in the vertical and horizontal directions from the balance bar 12 and therefore the arm 63 is different from the balance bar 12 as to the rotational angle as a result of which a twisting moment results at the suspension point 14a. The gimbal mechanism is provided to absorb this twisting moment.

The above-described system is disadvantageous in the following points.

(1) Since the balance fulcrum is above the axis of rotation of the horizontal arm, the total height of the laser knife device is increased a corresponding amount. When the end of the horizontal arm is lowered, the weight is lifted upwardly as a result of which the total height of the laser knife device is further increased. As was described before, it is desirable that the maximum height of the balance mechanism or the laser knife device be sufficiently low that the balance mechanism or the laser knife device cannot be brought into contact with an overhead lamp.

(2) A second disadvantage of the system relates to the position of the horizontal arm suspended by the balance bar and the technique used, for suspending the horizontal arm from the balance bar. According to the most frequently used system, a mirror articulation connected to the end of the horizontal arm is so designed that its junction is rotatable. Therefore, the suspension position of the balance bar is before the rotating part and the horizontal bar is lifted directly by the balance bar. Accordingly, a part of the manipulator which is attached to the suspending part may be bent. Since the horizontal arm turns both vertically and horizontally, it cannot be firmly coupled to the balance bar. That is, the horizontal bar must be suspended by means of a gimbal mechanism as a result of which the structure of the counterbalance mechanism becomes unavoidably intricate. Furthermore, according to this technique, the horizontal arm is lifted upwardly. When the horizontal arm is moved upwardly, it may be brought into contact with the overhead operating lamp.

The disadvantages of the conventional counterbalance can be summarized as follows. (1) As the fulcrum of the counter-balance is high, the total height of the laser knife is unavoidably high. (2) As the suspension technique used is not suitable, the optical axis of the manipulator may be disturbed.

Accordingly, an object of the present invention is to provide a counterbalance mechanism for a laser knife device in which all of the above-described difficulties have been eliminated and in which (1) moment-free operation of the manipulator is provided, (2) a suspension device which prevents bending of the manipulator is provided, (3) the total height of the laser knife device is limited to the extent that it will not strike adjacent structures such as the overhead operating lamp, and (4) the external appearance of the mechanism is simple so that the mechanism does not disturb the operator and is simple in construction and low in manufacturing cost.

SUMMARY OF THE INVENTION

In accordance with these and other objects, the invention provides a counterbalance mechanism characterized as follows.

(1) In order to provide moment-free operation of the manipulator, a parallelogram link mechanism is employed so that the fulcrum of the counterbalancing balance bar lies on a straight line connecting the center of gravity of the weight and that of the overall manipulator. (2) In order to prevent bending of the manipulator, the articulation at the end of the horizontal bar is coupled thereto in such a manner as to support the remainder of the manipulator. (3) In order to reduce the height of the counterbalance mechanism, the balance bar and the horizontal arm are disposed substantially in the same plane. (4) Protruding parts such as a gimbal mechanism and its lifting device which were employed in a conventional balance mechanism are eliminated and, accordingly, there is no danger that the operator could contact protruding parts and jar the manipulator.

Further, in accordance with these another objects of the invention, there is provided a counterbalance mechanism for a laser knife device having a manipulator including a support arm which is rotatable around a first arm, that is a hollow arm through which the laser light passes, of the manipulator in association with a second arm of the manipulator which extends through the support arm and which is supported thereby to be smoothly rotatable. A parallelogram link having four vertices is pivotably coupled to the support arm. The vertices include a first point on the axis of the second arm, a link point which is on a vertical line which passes through the first point on the axis of the second arm and which is a coupling point to the support arm and to link points on the opposite side on a third arm of the manipulator. The parallelogram is deformable in a vertical plane. A weight is coupled to the parallelogram link at a point on an extended line connecting the first point on the axis of the second arm with the center of gravity of the overall manipulator. The weight has a mass chosen to balance the rotational moment of the manipulator. An arm supporting a third articulation of the manipulator is formed integral with one of the arms forming the parallelogram link. With this construction, all rotational moments of the manipulator are cancelled when the manipulator is operated thereby greatly improving its operability.

Yet further in accordance with these and other objects of the invention, there is provided a counterbalance mechanism for a laser knife including a laser head to which is rotatably coupled through a bearing structure a base support arm having first and second substantially flat and parallel upright members. A first hollow arm of the structure is disposed at the center of rotation of the support arm. The first hollow arm extends a short distance upward to a point where it is joined through a first articulation to a horizontally extending arm which passes through the two upright members perpendicular to their planes. At the opposite side of the base support arm upright members the second hollow arm is coupled through a second articulation to a third hollow arm. A first support arm is pivotably coupled at one end to a point above the intersection of the second hollow arm and the upright members of the base support arm and a second support arm is rotatably and pivotably coupled around the second hollow arm between the two upright members. At the outer ends of the first and second support arms a weight is pivotably mounted through a generally vertically extending third support arm. The second support arm may extend forwardly if desired to support the outward end of the third hollow arm at a point where it joins a third articulation. The extending portion of the second support arm may be positioned either laterally or vertically of the third hollow arm.

DESCRIPTION OF THE PREFERRED EMBODIMENTS

Figure 2:
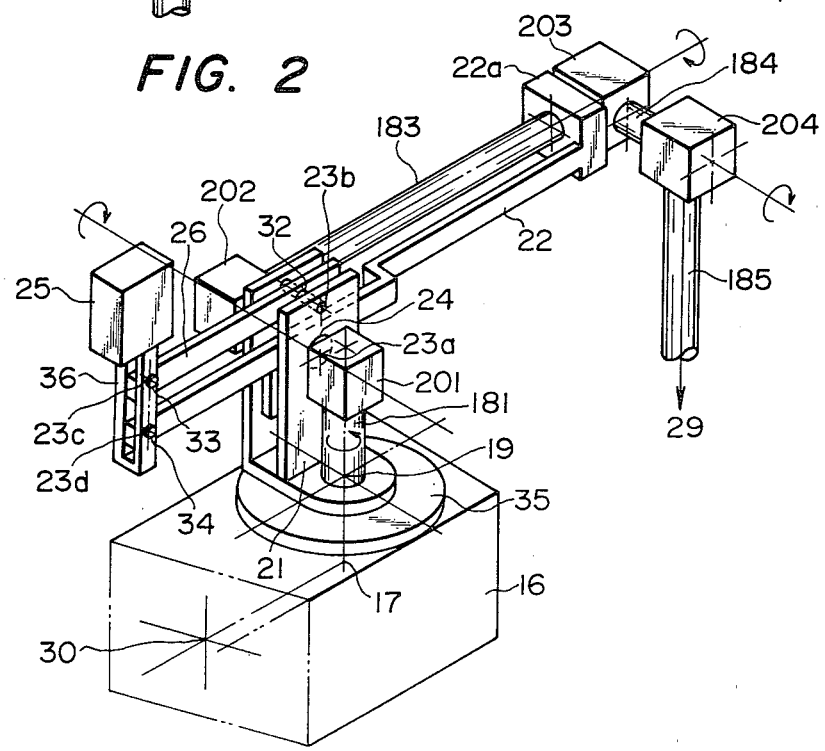
FIGS. 2, 3 and 4 are a perspective view, a plan view and an elevation view, respectively, of a balance mechanism of the invention.
Figure 3:
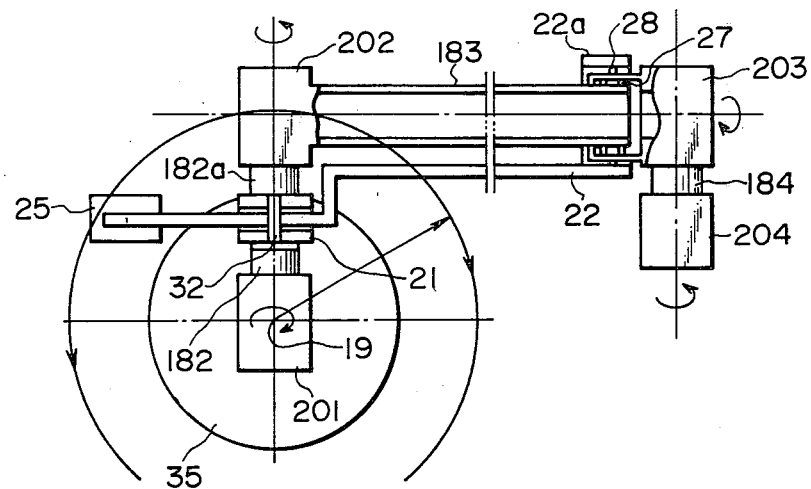
Figure 4:
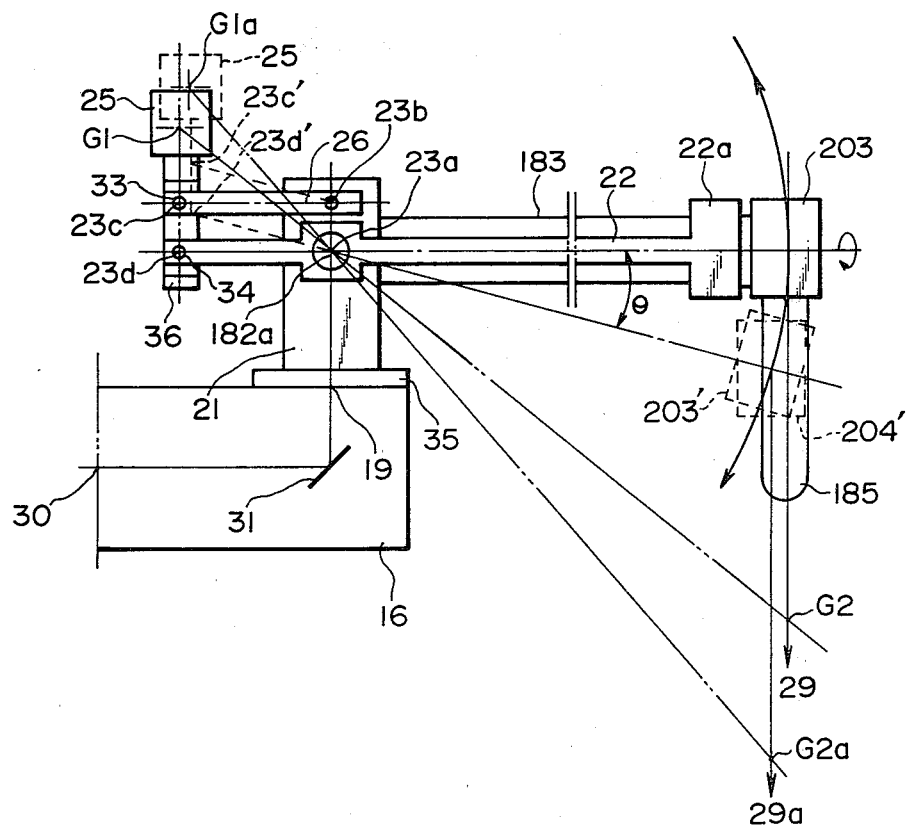

FIGS. 2, 3 and 4 show an example of a counterbalance mechanism constructed according to the invention. More specifically, FIG. 2 is a perspective view of the counterbalance mechanism, FIG. 3 is a plan view as viewed from above in FIG. 2, and FIG. 4 is a side view of the mechanism. The counterbalance mechanism of the invention will be described with reference to FIGS. 2, 3 and 4 concentrating upon FIG. 2. Sectional components and components which are not shown in FIG. 2 will be described with reference to FIGS. 3 and 4.

Figure 1:
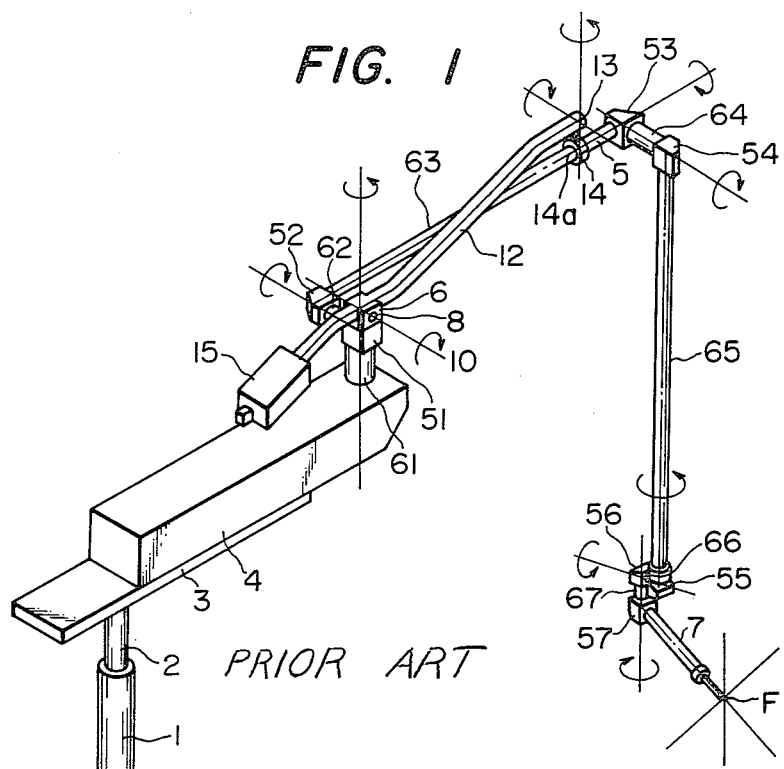
FIG. 1 is an explanatory diagram showing an example of a conventional counterbalance mechanism.

First, the basic arrangement of the manipulator of the invention will be described. A $CO_2$ laser source (not shown) may, for instance, be mounted inside a laser head 16. A laser beam from the emergent point 30 is reflected by a mirror 31 and is then applied to an incident point 19 on the axis of a first arm 181 of the manipulator (see also FIG. 4). The manipulator includes articulations 201, 202, 203 and 204 each having a mirror which changes the direction of the laser beam by 90°, the first arm 181, a second arm 182 (see FIG. 3), a third arm 183, a fourth arm 184 and a fifth arm 185, the arms serving as light introducing paths connecting the articulations. Each of the articulations is designated so as to be rotatable around the axis of the corresponding arm as indicated by the arrows. The laser beam emitted in the direction of the arrow 29 along the axis of the fifth arm 185 passes through three articulations and arms which are provided below the fifth arm and is focused into a small optical spot at the end of the handpiece. These components are not shown because they are similar to those in FIG. 1 which have been described previously.

Now, the counterbalance mechanism, which is the particular subject of the invention, will be described. The counterbalance mechanism of the invention includes a base support arm 21; a bearing 35; a parallelogram link composed of an arm 22, an arm 26, a vertical arm 36, and their link points; and a weight 25. The support arm 21 is secured to the first arm 181 in such a manner that its bottom can turn through the bearing 35, which may be a trackless thrust bearing, around the axis of the first arm 181. The support arm 21 has at its outer end portion two parallel flat plates which extend vertically. The parallelogram link is disposed between the two parallel flat plates. The two parallel flat plates have through-holes 24 through which the second arm 182 extends.

The arm 22, which is one of the components of the parallelogram link, will be described. The arm 22 supports the third articulation 203 and is rotatable around the axis of the second arm 182 (see FIG. 3). The arm 22 is arranged substantially parallel to the axis of the third arm 183 and is in a horizontal plane including that axis. The fulcrum of the arm 22 is at a point 23a on the axis of the second arm 182 (see FIG. 4). The arm 22 is fitted over the outer wall of the rotary mechanism 182a of the second articulation 202 which is coupled to the second arm 182 so that the arm 22 is rotatable around the axis of the second arm 182.

The arm 22 is coupled to the second arm 182 as described above. However, this construction may be replaced by the following structure. The inner peripheral surfaces of the through-holes 24 of the parallel flat plates forming the support arm 21 are formed as metal bearings or bearing mechanisms are provided on the inner peripheral surfaces thereof, and the arm 22 is disposed through the metal bearings or the bearing mechanism so that it is rotatable around the axis of the second arm 182 (see FIG. 4).

A preferred technique of the coupling arm 22 to the third articulation 203 is shown in FIG. 3. More specifically, the third articulation 203 is coupled through a bearing mechanism 27 to the third arm 183 so as to be rotatable around the axis of the third arm 183. The support end 22a of the arm 22 holds the third articulation, through a bearing mechanism, for instance, in such a manner that the third articulation 203 is rotatable therearound.

In the conventional device, the third horizontal arm 63 (see FIG. 1) is suspended directly by the gimbal mechanism. On the other hand, according to the invention, bending of the manipulator under its own weight after the suspension section is entirely eliminated. In addition, in accordance with the invention, no protruding part such as a gimbal mechanism is provided and, accordingly, the operator can never contact such to thereby jar the manipulator. Moreover, the external appearance of the counterbalance mechanism of the invention is simple. Another merit of the invention concerns the arrangement of the arm 22. That is, as the arm 22 and the third arm 183 are arranged in the same horizontal plane, the height of the laser device is decreased compared with the prior art structure and, accordingly, contact with an overhead lamp or the like is prevented.

Next, the parallelogram link mechanism used with the invention will be described in more detail with particular reference to FIG. 4. The arm 26 is positioned parallel to the arm 22 and is in the same vertical plane. The arm 26 is coupled to the two parallel flat plates of the support arm 21 at a link point 23b vertically above the fulcrum 23a of the arm 22 in such a manner that it is rotatable around a pin 32 (see FIG. 2). The arms 22 and 26, which extend in a direction opposite to the direction of extension of the third arm 183 with respect to the axis of the second arm 182, are rotatably coupled through respective pins 34 and 33 to the vertical arm 36. Thus, the fulcrum 23a of the arm 22, the link point 23b, and the axes 23c and 23d of the pins 33 and 34 form a parallelogram link whose configuration is freely changeable in the vertical plane. The weight 25 is fixedly secured to the top of the vertical arm 36. The weight 25 balances the overall weight of the manipulator so that the manipulator can be operated in a moment-free maner.

The center of gravity of the weight 25 and the center of gravity of the overall manipulator when the third arm 183 is held horizontally are designated by reference characters $G_1$ and $G_2$, respectively, in FIG. 4. The center of gravity $G_1$ of the weight 25 is so selected that a straight line connecting the points $G_1$ and $G_2$ always passes through the fulcrum 23a of the arm 22, that is, the line passes through a point on the axis of the second arm 182 and in the plane of the parallelogram link as indicated by double-dot/chain lines in FIG. 4. This is an advantageous feature of the invention.

When the third arm 183 is turned downwardly through an angle $\theta$ as shown in FIG. 4, the third articulation 203 and the fourth articulation 204 are moved to positions as indicated by 203' and 204', respectively, while the laser emergence point as indicated by arrow 29 is shifted to the position indicated by 29a and the center of gravity $G_2$ is moved to the position indicated by $G_2a$. The parallelogram 23a, 23b, 23c, 23d is changed in a parallelogram 23a', 23b', 23c', 23d' as indicated by dotted lines and the center of gravity of the weight 25 moves to a point $G_1a$.

As is clear from the above description, the straight line connecting the center of gravity $G_1$ of the weight 25 and the center of gravity $G_2$ of the overall manipulator always passes through the fulcrum point 23a no matter in what direction, vertically or horizontally, the manipulator is moved. Thus, the counterbalance mechanism of the invention provides moment-free operation for the manipulator.

The parallelogram link constructed as described is not bendable. The weight 25 is inclined by the same angle as the angle of rotation of the third arm 183 and the straight line connecting the center of gravity $G_1$ of the weight 25 and the center of gravity $G_2$ of the manipulator will always pass through the fulcrum 23a. It follows from simple geometric considerations that no variations in moment of the manipulator can disadvantageously occur.

The technique used for suspending the arm 22 and the third articulation 203 is not limited to that described above. That is, if the configuration and material of the third arm 183 are so selected that the rigidity of the third arm 183 is increased and the possibility of bending the manipulator is considerably decreased, then the arm 22 can support the third arm 183 in the vicinity of the second articulation 202. If the third arm 183 is sufficiently rigid, then it is unnecessary to use the arm 22 to support the third arm 183. If the third arm 183 is not sufficiently rigid, a technique can be employed in which the arm 22 is provided with a cylindrical shape covering the third arm 183 and the rotating part of the third articulation 203 is supported by the end portion 22a of the arm 22 as shown in FIG. 3.

Furthermore, the invention is not limited to a structure in which the end portion of the arm 22 covers and suspends the entire rotatable part of the third articulation 203. In addition, the invention is not limited to an arrangement in which the arm 22 is positioned on the horizontal side of the third arm 183. That is, it may also be disposed vertically below the third arm 183.

In the above-described embodiment, the weight 25 is positioned above the parallelogram link. However, the invention is not limited thereto or thereby. That is, the weight 25 can be fixedly provided at any suitable point on the parallelogram link as long as the manipulator can be operated in a moment-free manner as described above. However, it should be noted that, as the weight 25 is attached to the top of the vertical arm 36, and the arm 22 is positioned on the horizontal side of the third arm 183 in the above-described embodiment, it is possible to make the first arm 181 short which results in a reduction of the height of the laser knife device. This is one of the specific advantageous features of the invention.

Thus constructed, the counterbalance mechanism for a laser knife device constructed according to the present invention has the following merits and features. (1) It permits moment-free operation of the manipulator although it is relatively simple in arrangement. (2) Suspension means is provided which eliminates bending of the manipulator and especially bending of the horizontal arm. (3) Because the total height of the laser knife device is reduced according to the invention, the operator can work without any danger of touching an overhead lamp or the like. (4) No unnecessary protruding components are used at the manipulator suspension section and, accordingly, the external appearance of the manipulator is simple. Also, there is no possibility of jarring the instrument by impact with such a protruding component.

The counterbalance mechanism according to the invention is applicable not only to the above-described laser knife device but also to any manipulator mechanism of the same general type.

What is claimed is:

1. A counterbalance mechanism for a laser knife device including a manipulator having first, second and third arms, comprising:

a base support arm which is rotatable around said first arm of said manipulator, said second arm of said manipulator extending through said base support arm and being supported thereby to be smoothly rotatable, said third arm extending outward from one side of an axis of said second arm and being substantially perpendicular to said axis;

a parallelogram link having four vertices, a first vertex being a point on the axis of said second arm, a second vertex being a link point on a vertical line passing through said first point, said link point acting as a pivotal coupling point to said support arm, and a third and fourth vertex being additional link points and being on an opposite side of said axis, said parallelogram link being deformable in a vertical plane;

a weight coupled to said parallelogram link so that a center of gravity of said weight is at a point on an extended line connecting said first point with a center of gravity of the overall manipulator, said weight having a mass to balance a rotational moment of said manipulator; and a second support arm supporting a third articulation of said manipulator, said second support arm being integral with said parallelogram link to cancel the rotational moment of said manipulator when said manipulator is operated.

2. A counterbalance mechanism for a laser knife device including a manipulator comprising:

first, second and third arms, said first, second and third arms being hollow, said first hollow arm extending upwardly from a laser head, said second hollow arm extending horizontally and being joined to said first hollow arm by a first articulation, said third hollow arm being joined to said second hollow arm by a second articulation;

a base support arm rotatably mounted upon said laser head, said base support arm having first and second upright flat members disposed parallel to one another, said second hollow arm extending through said upright members perpendicular to the planes thereof;

first and second pivotally mounted support arms, said first and second pivotably mounted support arms being disposed parallel to one another with said first support arm being generally above said second support arm, said first support arm having a first end pivotably coupled to said base support arm between said upright members at a position above said second hollow arm, said second support arm having a first end pivotably mounted around said second hollow arm;

a third support arm pivotably coupled to second ends of said first and second support arms and extending generally in a vertical direction; and a weight positioned upon an upper end of said third support arm, the mass of said weight being chosen to balance said manipulator.

3. The counterbalance mechanism of claim 2 further comprising a third articulation coupled to an outward end of said third hollow arm and wherein said second support arm comprises a portion extending forwardly from said base support arm, said forwardly extending portion being coupled to support said outward end of said third hollow arm and said third articulation.

4. The counterbalance mechanism of claim 3 wherein said forwardly extending portion of said second support arm is located laterally of said third hollow arm.

5. The counterbalance mechanism of claim 3 wherein said forwardly extending portion of said second support arm is located vertically of said third hollow arm.

6. The counterbalance mechanism of any of claims 2-5 further comprising bearing means for rotatably supporting said base support arm around said first hollow arm.

* * * * *